United States Patent
Lee

(10) Patent No.: US 10,298,687 B2
(45) Date of Patent: May 21, 2019

(54) METHOD, APPARATUS AND COMPUTER PROGRAM PRODUCT FOR MANAGING STORAGE SYSTEM

(71) Applicant: Synology Incorporated, Taipei (TW)

(72) Inventor: Yi-Chien Lee, Taipei (TW)

(73) Assignee: Synology Incorporated (TW)

( * ) Notice: Subject to any disclaimer, the term of this patent is extended or adjusted under 35 U.S.C. 154(b) by 962 days.

(21) Appl. No.: 14/261,440

(22) Filed: Apr. 25, 2014

(65) Prior Publication Data

US 2015/0142909 A1    May 21, 2015

(30) Foreign Application Priority Data

Nov. 18, 2013    (TW) .............................. 102141903 A

(51) Int. Cl.
*H04L 29/08*    (2006.01)

(52) U.S. Cl.
CPC ...... *H04L 67/1097* (2013.01); *H04L 67/2809* (2013.01)

(58) Field of Classification Search
CPC ............. H04L 67/1097; H04L 67/2809; H04L 12/2419; H04L 67/1095; H04L 67/1002; H04L 67/1008; H04L 67/101; H04L 41/00; H04L 67/1014; H04L 67/42; H04L 29/08; G06F 17/30; G06F 17/30194; G06F 11/1469; G06F 11/2094; G06F 3/067; G06F 11/2097; G06F 17/30589; G06F 17/30917; G06F 3/061; G06F 17/30598; G06F 2212/1016; G06F 11/1461; G06F 11/2087; G06F 3/0614; G06F 3/0656; G06F 3/0689
See application file for complete search history.

(56) References Cited

U.S. PATENT DOCUMENTS 7,617,369 B1 * 11/2009 Bezbaruah .......... G06F 11/2074
                                                      707/999.2
7,996,718 B1    8/2011 Ou
(Continued)

FOREIGN PATENT DOCUMENTS

CN    1554055 A    12/2004
CN    1942862 A    4/2007
(Continued)

*Primary Examiner* — Sargon N Nano
(74) *Attorney, Agent, or Firm* — Stevens & Showalter, LLP

(57) ABSTRACT

A method for managing a storage system, an associated apparatus, and an associated computer program product are provided, wherein the storage system includes a plurality of network storage devices, and the method includes the steps of: utilizing a broker module to receive a command from a client device; and utilizing the broker module to publish the command to a primary node and a secondary node in the storage system, to control the primary node and the secondary node perform a same operation corresponding to the command, and utilizing the broker module to receive acknowledgement from the primary node and acknowledgement from the secondary node, wherein the primary node represents at least one network storage device utilized as a primary responder within the plurality of network storage devices, and the secondary node represents at least one network storage device utilized as a secondary responder within the plurality of network storage devices.

13 Claims, 9 Drawing Sheets

(56) References Cited

U.S. PATENT DOCUMENTS

| | | | |
|---|---|---|---|
| 2005/0281280 A1* | 12/2005 | Zur | H04L 67/1097 370/419 |
| 2008/0222661 A1* | 9/2008 | Belyakov | H04L 69/40 719/321 |
| 2009/0083740 A1* | 3/2009 | Mathew | G06F 9/5055 718/102 |
| 2010/0161843 A1* | 6/2010 | Spry | H04L 67/1097 710/22 |
| 2010/0199042 A1* | 8/2010 | Bates | H04L 67/289 711/114 |
| 2011/0178983 A1 | 7/2011 | Bernhard | |
| 2012/0158670 A1* | 6/2012 | Sharma | G06F 3/0608 707/692 |
| 2013/0036091 A1* | 2/2013 | Provenzano | G06F 17/30162 707/624 |
| 2014/0075007 A1* | 3/2014 | Kumar | H04L 67/1097 709/224 |
| 2014/0195622 A1* | 7/2014 | Cullen | G06Q 30/02 709/206 |
| 2014/0280382 A1* | 9/2014 | Gabay | G06Q 10/087 707/812 |
| 2014/0365433 A1* | 12/2014 | Hong | G06F 17/30581 707/611 |
| 2015/0078111 A1* | 3/2015 | Jibbe | G11C 7/1006 365/218 |
| 2016/0162371 A1* | 6/2016 | Prabhu | G06F 11/1461 707/654 |

FOREIGN PATENT DOCUMENTS

| | | |
|---|---|---|
| CN | 101471956 A | 7/2009 |
| CN | 101908377 A | 12/2010 |
| CN | 102843284 A | 12/2012 |
| TW | 200825724 | 6/2008 |

\* cited by examiner ically is the session will be interrupted. Besides, based on the controlling of the traditional high availability
METHOD, APPARATUS AND COMPUTER PROGRAM PRODUCT FOR MANAGING STORAGE SYSTEM

BACKGROUND OF THE INVENTION

1. Field of the Invention

The present invention relates to controlling a storage area network (SAN), and more particularly, to a method, an apparatus and a computer program product for managing a storage system.

2. Description of the Prior Art

The controlling of a traditional high availability storage system may have some problems. For example, when a primary node is offline, a secondary node will take over the service within a short time. However, at the moment the secondary node starts to operate, since the traditional high availability storage system has not been synchronous with the state of the internet small computer system interface (iSCSI) target, the session will be interrupted. Besides, based on the controlling of the traditional high availability storage system, all of information flow goes through the primary node, making the primary node become a performance bottleneck. Therefore, there is a need to provide a novel method for improving the performance of storage systems.

SUMMARY OF THE INVENTION

Hence, an object of the present invention is to provide a method, an apparatus and a computer program product for managing a storage system, to solve the aforementioned problem.

Another object of the present invention is to provide a method, an apparatus and a computer program product for managing a storage system, to improve the performance of the storage system.

Another object of the present invention is to provide a method, an apparatus and a computer program product for managing a storage system, to insure the high availability of data.

At least one preferable embodiment of the present invention provides a method for managing a storage system, wherein the storage system includes a plurality of network storage devices, and the method includes the following steps: utilizing a broker module to receive a command from a client device; and utilizing the broker module to publish the command to a primary node and a secondary node in the storage system, to control the primary node and the secondary node perform a same operation corresponding to the command, and utilizing the broker module to receive acknowledgement from the primary node and acknowledgement from the secondary node, wherein the primary node represents at least one network storage device utilized as a primary responder within the plurality of network storage devices, and the secondary node represents at least one network storage device utilized as a secondary responder within the plurality of network storage devices.

Besides providing the above method, the present invention also correspondingly provides an apparatus for managing a storage system, wherein the storage system includes a plurality of network storage devices, and the apparatus includes a network module and a processing circuit. The network module is used to provide a network service to the apparatus, to maintain the operation of the storage system. The processing circuit is coupled to the network module, and arranged for controlling the operation of the storage system. More particularly, the processing circuit includes a broker module, arranged for receiving a command from a client device through the network module. Further, the broker module publishes the command to a primary node and a secondary node in the storage system, to control the primary node and the secondary node perform a same operation corresponding to the command, and utilizing the broker module to receive acknowledgement from the primary node and acknowledgement from the secondary node. Moreover, the primary node represents at least one network storage device utilized as a primary responder within the plurality of network storage devices, and the secondary node represents at least one network storage device utilized as a secondary responder within the plurality of network storage devices.

Besides providing the above method and apparatus, the present invention also correspondingly provides a computer program product, wherein the computer program product includes a program code to indicate at least one processor to perform the above method.

Compared with the related art, one of the advantages offered by method, apparatus and computer program product of the present invention is that the reliability of the storage system can be improved. Further, the method, apparatus and computer program product of the present invention are capable of insuring the high availability of data.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
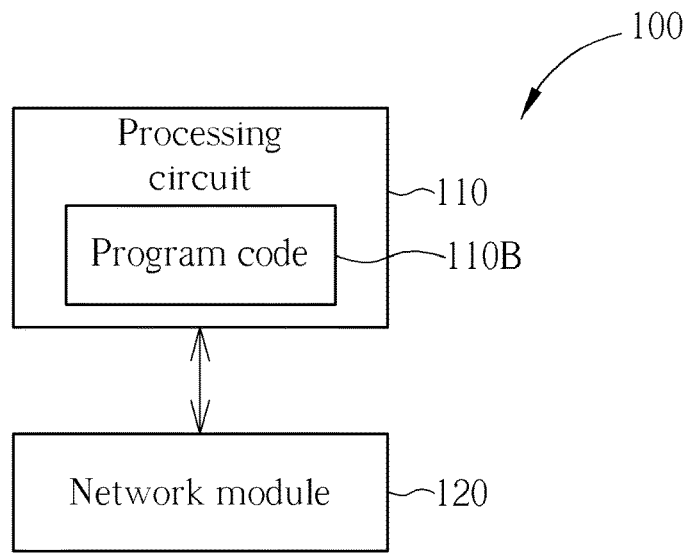
FIG. 1 is a diagram illustrating an apparatus for managing a storage system according to a first embodiment of the present invention.

Please refer to FIG. 1, which is a diagram illustrating an apparatus 100 for managing a storage system according to a first embodiment of the present invention, wherein the storage system includes a plurality of network storage devices. For example, the storage system may include at least one server (e.g., one or more servers), and each server may include multiple physical storage devices such as a plurality of hard disk drives. However, this is merely for illustration, and is not meant to be a limitation of the present invention. In practice, the apparatus 100 may include at least a portion (e.g., part or all) of the storage system, and an example of the storage system may include (but not limited to) a storage area network (SAN). However, this is merely for illustration, and is not meant to be a limitation of the present invention.

As shown in FIG. 1, the apparatus 100 includes a processing circuit 110 and a network module 120, and the processing circuit 110 and the network module 120 are coupled to each other. According to this embodiment, the network module 120 is used to provide a network service for the apparatus 100 to maintain the operation of the storage system. For example, the network module 120 may include one or more network interface circuits. Further, the processing circuit 110 may include at least one processor to perform the program code 110B. More particularly, the processing circuit 110 includes a broker module (not shown in FIG. 1) for controlling the storage system. For example, the broker module may be at least one program module in the program code 110B, such as at least one software module, wherein the program code 110B may represent a program performed in the aforementioned at least one server. However, this is merely for illustration, and is not meant to be a limitation of the present invention. According to some modifications based on this embodiment, the program code 110B may be embedded in the processing circuit 110, and the broker module may be a hardware module, such as at least a portion (e.g., part or all) of the processing circuit 110, wherein the broker module may be an electronic device located outside the aforementioned at least one server.

Figure 2:
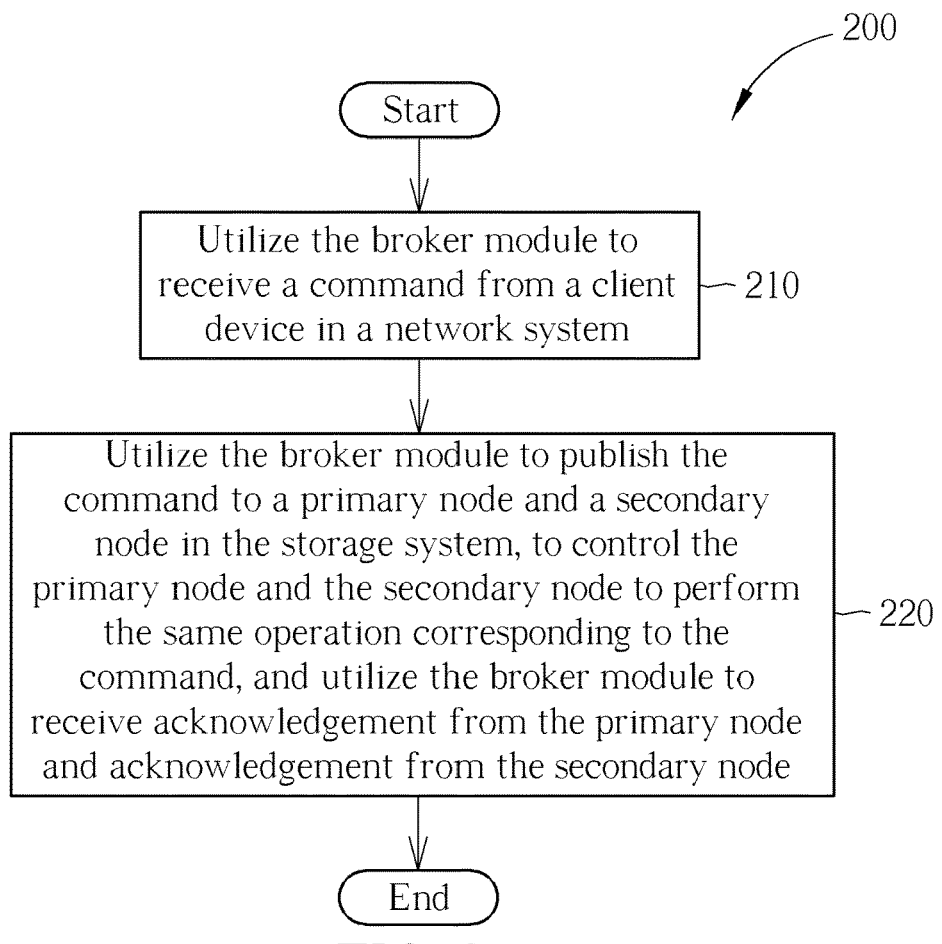
FIG. 2 is a flowchart illustrating a method for managing a storage system according to an embodiment of the present invention.

FIG. 2 is a flowchart illustrating a method 200 for managing a storage system according to an embodiment of the present invention. The method 200 may be applied to the apparatus 100 shown in FIG. 1, and more particularly, to the aforementioned processing circuit 110, e.g., the processing circuit 110 executes the aforementioned program code 110B through the aforementioned at least one processor. For example, through utilizing a computer program product, such as an optical disc storing the program code 110B (more particularly the installation version thereof), the administrator of the storage system may install the program code 110B on the apparatus 100, wherein the computer program product includes the program code 110B (more particularly, the installation version thereof) to indicate the aforementioned at least one processor to perform the method 200 shown in FIG. 2. However, this is merely for illustration, and is not meant to be a limitation of the present invention.

In step 210, the apparatus 100 utilizes the broker module to receive a command from a client device in a network system, wherein the client device may access data in the storage system through the network system. For example, the storage system may be an internet small computer system interface (hereinafter iSCSI) storage system, and the command may be an iSCSI command.

In step 220, the apparatus 100 utilizes the broker module to publish the command to a primary node and a secondary node in the storage system, to control the primary node and the secondary node to perform the same operation corresponding to the command, and utilizes the broker module to receive acknowledgement from the primary node and acknowledgement from the secondary node, wherein the primary node represents at least one network storage device utilized as a primary responder within the plurality of network storage devices, and the secondary node represents at least one network storage device utilized as a secondary responder within the plurality of network storage devices. For example, the client device may be an initiator of the iSCSI session, and the primary node and the secondary node may be targets of the iSCSI session.

Please note that, the operations of step 210 and step 220 depicted in FIG. 2 are merely for illustration, and are not meant to be limitations of the present invention. For example, the apparatus 100 may further utilize the broker module to perform other operations. In practice, regarding the iSCSI session, the internet protocol address (hereinafter IP address) observed from the initiator is the external IP address of the broker module. Hence, the operation of establishing the iSCSI session may be viewed as the initiator and the broker module establishing the iSCSI session (that is, the apparatus 100 may utilize the broker module to establish the iSCSI session), wherein when the broker module receives a specific command for establishing the iSCSI session, the broker module may publish the specific command to multiple targets (e.g., the target iSCSI_TGT(0) and the target iSCSI_TGT(1), which are not shown in FIG. 2) to establish the iSCSI session. However, this is merely for illustration, and is not meant to be a limitation of the present invention.

According to this embodiment, the apparatus 100 may utilize the broker module to temporarily store information representing the command into a buffer of the apparatus 100 (which may be implemented through utilizing a memory, a hard disk or any non-volatile storage medium), to indicate that the operation of a current session corresponding to the command is not completed. Further, the apparatus 100 may utilize the broker module to control a specific node in the primary node and the secondary node to directly respond to the client device via a direct server return, wherein the specific node is selected according to states of the primary node and the secondary node, and the other node in the primary node and the secondary node does not respond to the client device. However, this is merely for illustration, and is not meant to be a limitation of the present invention. According to some modifications of this embodiment, a set of servers in the storage system used for implementing the aforementioned multiple targets may communicate with one another, and the set of servers may elect (or select) a server to be used as the primary node through voting. Then this server (or another server) may notify the broker module with the electing result. Hence, the server elected as the primary node may directly respond to the client device via the direct server return.

In this embodiment, the apparatus 100 may utilize the broker module to check whether the client device transmits an acknowledgement corresponding to the direct server return. When the broker module receives the acknowledgement corresponding to the direct server return, the apparatus 100 may utilize the broker module to erase the information representing the command in the buffer. This means that the operations relating to the command have been processed. More particularly, under the situation that the buffer is used merely to temporarily store the aforementioned information representing the command, erasing the information representing the command is equivalent to clear the buffer. However, this is merely for illustration, and is not meant to be a limitation of the present invention.

For example, under a situation that the primary node is in an online state ONL, the apparatus 100 may utilize the broker module to select the primary node as the specific node, to control the primary node to directly respond to the client device via the direct server return. For another example, under a situation that the primary node is in an offline state OFFL, the apparatus may utilize the broker module to select the secondary node as the specific node to control the secondary node to directly respond to the client device via the direct server return. More particularly, the apparatus 100 may utilize the broker module to control the secondary node to directly respond to the client device via the direct server return. However, this is merely for illustration, and is not meant to be a limitation of the present invention. According to some modifications of this embodiment, the roles of the primary node and the secondary node may be redefined, and more particularly, may be exchanged. For example, under the situation that the primary node is in an abnormal state (e.g., the offline state OFFL or a state at which commands cannot be received), the apparatus 100 may utilize the broker module to define the network storage devices represented by the secondary node and the primary node as a newest primary node and a newest secondary node, respectively, to utilize the newest primary node to directly respond to the client device via a direct server return.

In each of the following embodiments, the broker module BPK may be an example of the aforementioned broker module, the initiator iSCSI_INT may be an example of the aforementioned initiator, and the target iSCSI_TGT(0) and the target iSCSI_TGT(1) may be examples of the aforementioned targets. For better understanding of the technical features of the present invention, various roles in some control schemes, such as the publish PUB, the response REP, the request REQ and the subscribe SUB, are illustrated; and some target states such as the waiting state WT, the online state ONL, the offline state OFFL and the standby state SB, are depicted in some embodiments. The symbol "S" represents the state of the power, and more particularly, the normal power state.

Figure 3:
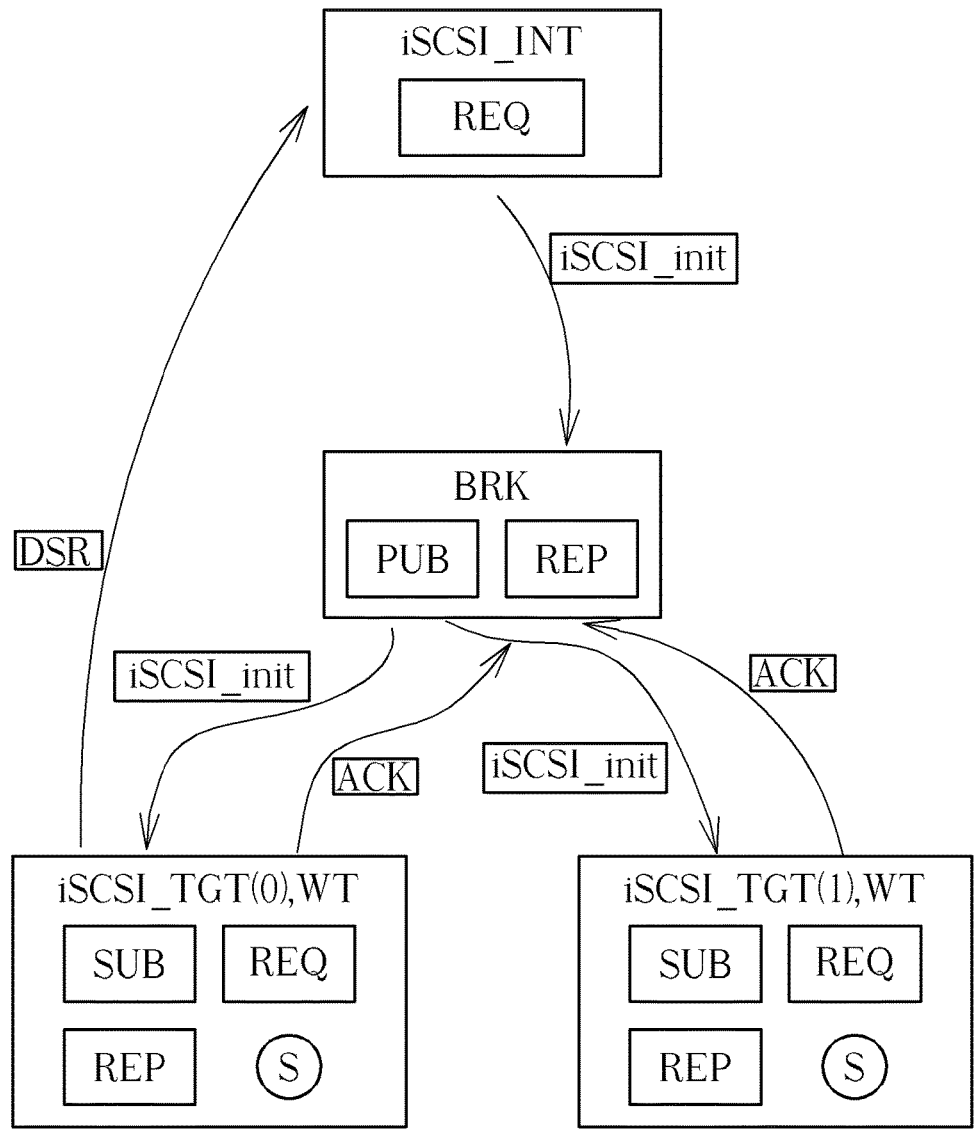
FIG. 3 depicts the initializing operation of a control scheme involved by the method shown in FIG. 2 according to an embodiment.

Please refer to FIG. 3, which depicts the initializing operation of a control scheme involved by the method 200 shown in FIG. 2 according to an embodiment, wherein the initializing command iSCSI_init may be an example of the aforementioned command, and the acknowledgement ACK may be an example of the aforementioned acknowledgement. After receiving the initializing command iSCSI_init, the broker module BPK publishes the initializing command iSCSI_init to the target iSCSI_TGT(0) and the target iSCSI_TGT(1), and then receives the acknowledgement ACK from the target iSCSI_TGT(0) and the acknowledgement from the target iSCSI_TGT(1). In this embodiment, under the control of the broker module BPK, the target iSCSI_TGT(0) may utilize the direct server return DSR to directly respond to the initiator iSCSI_INT. The illustrations similar to the aforementioned embodiments/modifications will be omitted in this embodiment for brevity.

Figure 4:
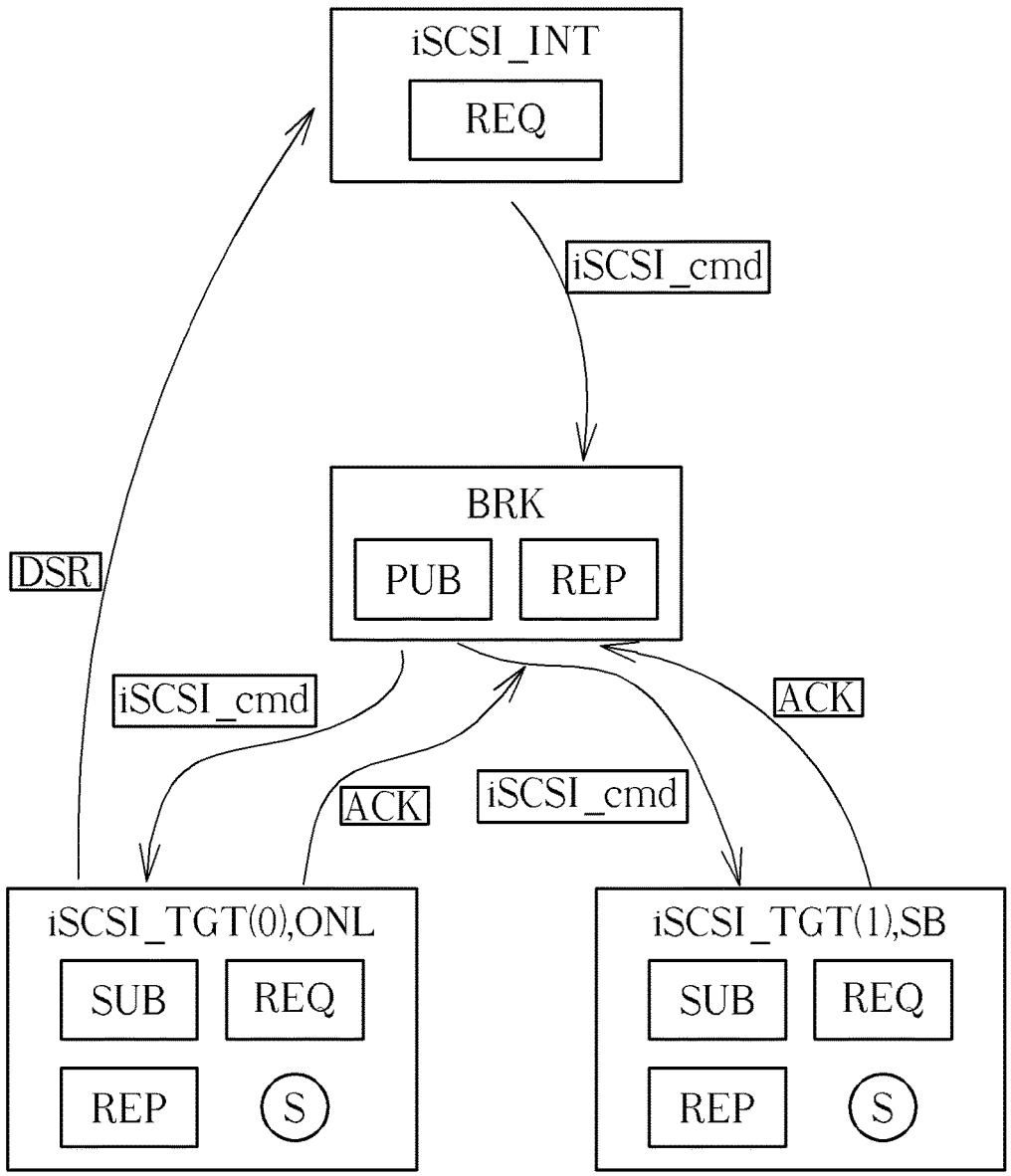
FIG. 4 depicts the operation performed upon the primary node by the control scheme in the embodiment shown in FIG. 3.

Please refer to FIG. 4, which depicts the operation performed upon the primary node by the control scheme in the embodiment shown in FIG. 3, wherein the command iSCSI_cmd may be an example of the aforementioned command, and the direct server return DSR may be an example of the aforementioned direct server return. After receiving the command iSCSI_cmd (e.g., the write command or the read command), the broker module BPK publishes the command iSCSI_cmd to the target iSCSI_TGT(0) and the target iSCSI_TGT(1), and receives the acknowledgement ACK from the target iSCSI_TGT(0) and the acknowledgement from the target iSCSI_TGT(1). Under the situation that the target iSCSI_TGT(0) is in the online state ONL, the broker module BPK selects the target iSCSI_TGT(0) as the specific node, to control the target iSCSI_TGT(0) to directly respond to the initiator iSCSI_INT via the direct server return DSR. The illustrations similar to the aforementioned embodiments/modifications will be omitted in this embodiment for brevity.

Figure 5:
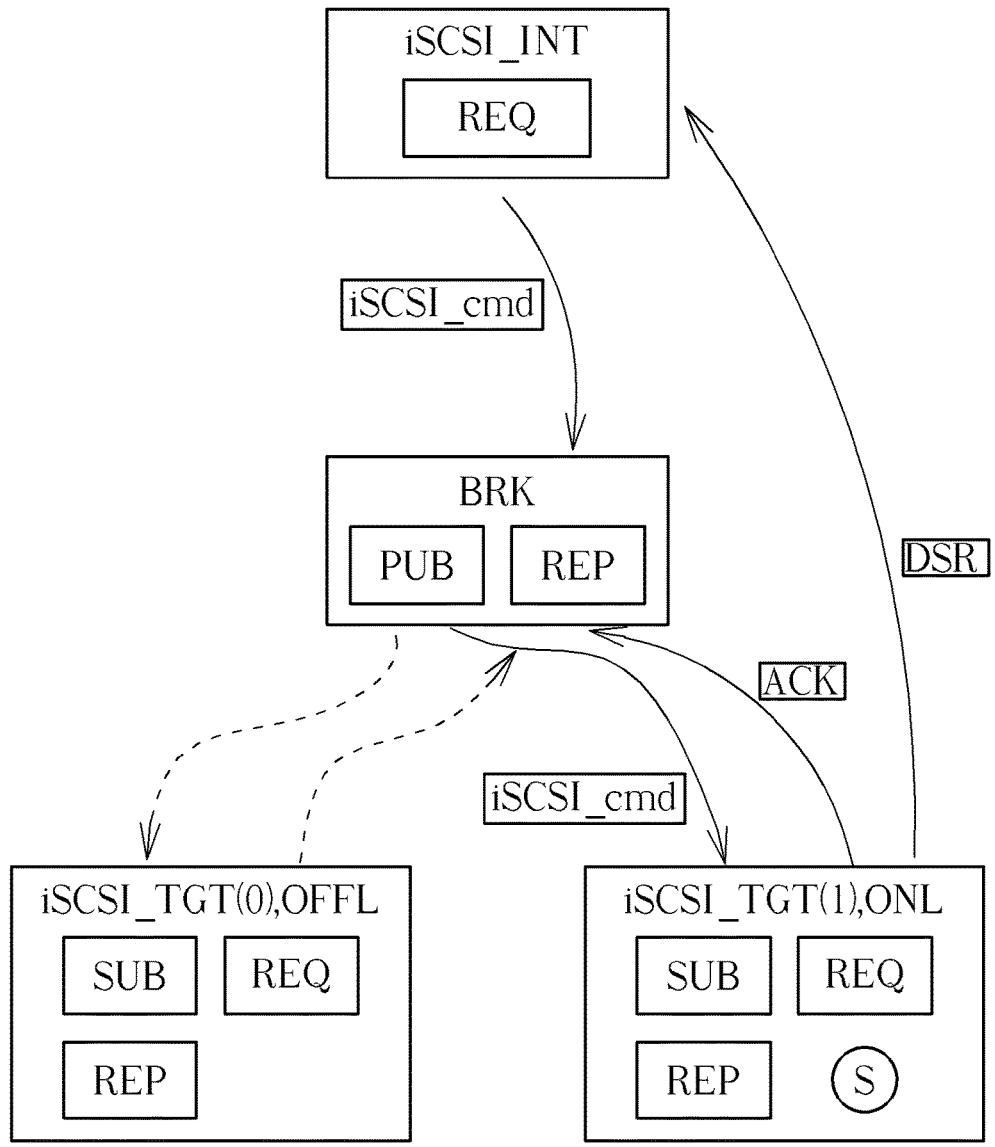
FIG. 5 depicts the operation performed upon the secondary node by the control scheme in the embodiment shown in FIG. 3.

Please FIG. 5, which depicts the operation performed upon the secondary node by the control scheme in the embodiment shown in FIG. 3. After receiving the command iSCSI_cmd (e.g. the write command or the read command), the broker module BPK publishes the command iSCSI_cmd to the target iSCSI_TGT(0) and the target iSCSI_TGT(1), and receives the acknowledgement ACK from the target iSCSI_TGT(1), wherein the target iSCSI_TGT(0) is in the offline state OFFL (e.g., the power of the target iSCSI_TGT(0) is abnormal), and thus may not receive the command iSCSI_cmd and may not transmit the acknowledgement ACK to the broker module. More particularly, under the situation that the target iSCSI_TGT(0) is in the offline state OFFL, the broker module BPK selects the target iSCSI_TGT(1) as the specific node, to control the target iSCSI_TGT(1) to directly respond to the initiator iSCSI_INT via the direct server return DSR. In practice, during the procedure of waiting for the acknowledgement ACK from the target iSCSI_TGT(0), the broker module BPK may check whether the length of a waiting time interval (whose start time may be the time of publishing the command iSCSI_cmd) reaches a predetermined time threshold, to determine whether the target iSCSI_TGT(0) is in the offline state OFFL. Under a situation that the acknowledgement ACK from the target iSCSI_TGT(0) is not received, when the waiting time internal reaches the predetermined time threshold, the broker module BPK may determine that the target iSCSI_TGT(0) is in the offline state OFFL. The illustrations similar to the aforementioned embodiments/modifications will be omitted in this embodiment for brevity.

Figure 6:
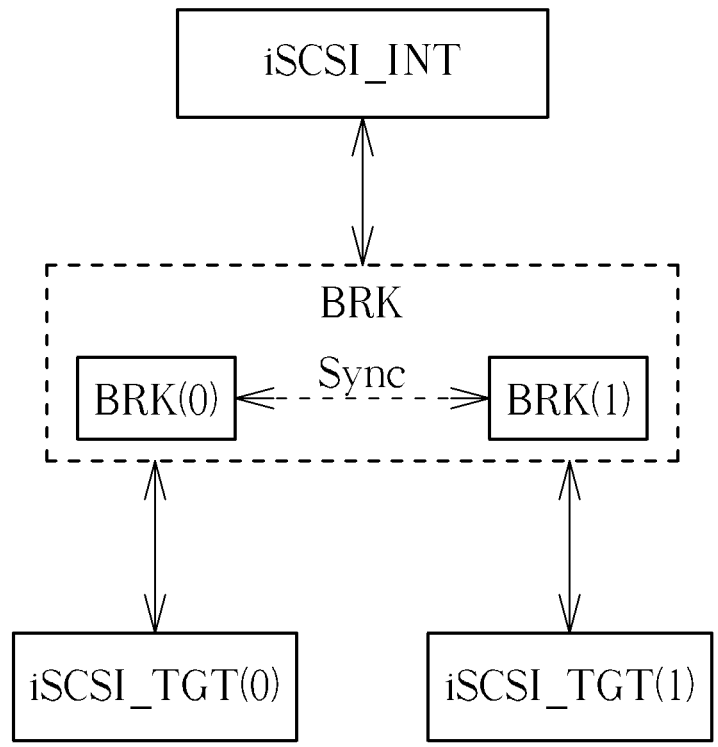
FIG. 6 depicts a control scheme involved by the method shown in FIG. 2 according to another embodiment.

Please refer to FIG. 6, which depicts a control scheme involved by the method 200 shown in FIG. 2 according to another embodiment. In order to insure that the entire system structure is free of single point of failure (SPOF), the broker module BPK may include a broker sub-module BPK(0) and a broker sub-module BPK(1), wherein the broker module BPK in this embodiment is mainly used for forwarding the iSCSI command and sustaining the buffering state, and each of the broker sub-module BPK(0) and the broker sub-module BPK(1) may be arranged to include the aforementioned buffer. After one of the broker sub-module BPK(0) and the broker sub-module BPK(1) receives the command, the broker sub-module which receives the command will communicate with the other broker sub-module with the synchronization information Sync, in order to synchronize the buffering state and the system state to achieve high availability. Please note that, as long as the implementation of the present invention will not be hindered, the broker sub-module BPK(0) and the broker sub-module BPK(1) may be located in different physical structures, such as two electronic apparatuses, wherein each of the electronic apparatuses may be implemented through utilizing the apparatus 100 shown in the modifications of the embodiment of FIG. 1. However, this is merely for illustration, and is not meant to be a limitation of the present invention. The illustrations similar to the aforementioned embodiments/modifications will be omitted in this embodiment for brevity.

Figure 7:
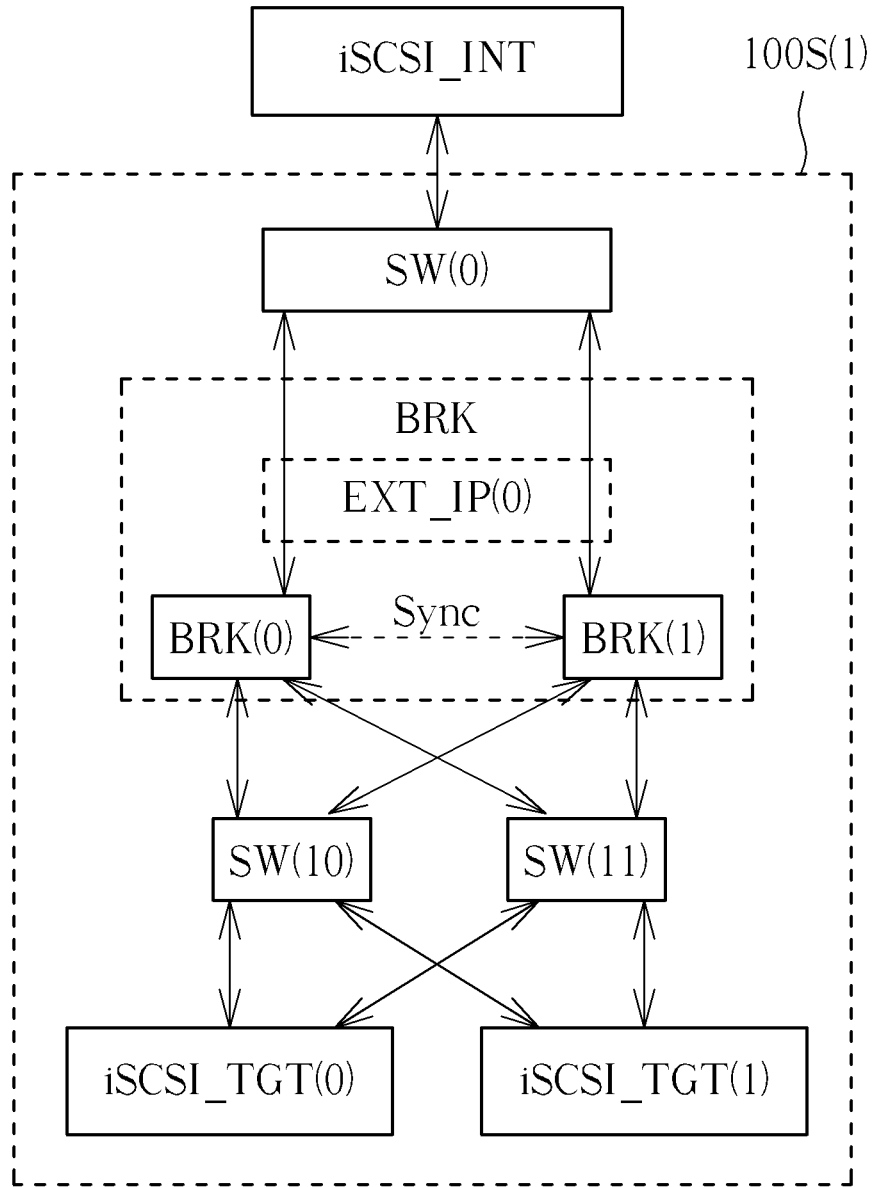
FIG. 7 depicts a control scheme involved by the method shown in FIG. 2 according to another embodiment.

Please refer to FIG. 7, which depicts a control scheme involved by the method 200 shown in FIG. 2 according to another embodiment, wherein the storage area network 100S(1) may be an example of the storage area network in the embodiment shown in FIG. 1, and the broker module BPK in this embodiment may include the aforementioned two apparatuses. As shown in the upper half part of FIG. 7, the storage area network 100S(1) may include a switch SW(0) coupled between the initiator iSCSI_INT and the broker module BRK, and the broker sub-modules BPK(0) and BPK(1) share the same external IP address EXT_IP(0). More particularly, in the beginning, the network administrator of the storage system may indicate one of the broker sub-modules BPK(0) and BPK(1) as the primary broker sub-module, wherein the other broker sub-module will be the secondary broker sub-module, and the secondary broker sub-module may be a backup device of the primary broker sub-module. Hence, the IP address EXT_IP(0) will be set on the primary broker sub-module. Then, the primary broker sub-module may utilize the IP address EXT_IP(0) to contact the client, and transmit the synchronization information Sync of the buffer to the secondary broker sub-module. The secondary broker sub-module may detect whether the primary broker sub-module is offline anytime, and set the IP address EXT_IP(0) on the network card of the secondary broker sub-module when detecting that the primary broker sub-module is offline. For example, the secondary broker sub-module may utilize the packet internet groper (ping) command to detect whether the primary broker sub-module is offline. For another example, the secondary broker sub-module may utilize the connection of the transmission control protocol/internet protocol (TCP/IP) to detect whether the primary broker sub-module is offline. After the secondary broker sub-module sets the IP address EXT_IP(0) on its network card, the secondary broker sub-module may transmit an address resolution protocol (ARP) command to the switch SW(0), to update the ARP table in the switch (0). Hence, the initiator iSCSI_INT may transmit the information to the secondary broker sub-module instead of transmitting the information to the primary broker sub-module. In this way, regarding the broker sub-modules BPK(0) and BPK(1), the roles of the primary broker sub-module and the secondary broker sub-module may be interchanged. For example, in the beginning, the broker sub-modules BPK(0) and BPK(1) may be the primary broker sub-module and the secondary broker sub-module, respectively. Then, when the broker sub-module BPK(0) is offline (0), the broker sub-module BPK(1) will become the newest primary broker sub-module, and the broker sub-module BPK(0) will become the newest secondary broker sub-module. However, this is merely for illustration, and is not meant to be a limitation of the present invention.

Please note that, when one of the target iSCSI_TGT(0) and the target iSCSI_TGT(1) utilizes the direct server return DSR to respond, the IP address in the packet of the direct server return DSR may be changed to the IP address of the broker module BPK(the aforementioned IP address EXT_IP (0) in this embodiment) in advance, as if it were transmitted by the direct server return DSR from the broker module BPK. In practice, the network administrator of the storage system may set the targets iSCSI_TGT(0) and iSCSI_TGT (1) in advance, thus making the IP address in the packet of the direct server return DSR remain the IP address of the broker module BPK when one of the targets iSCSI_TGT(0) and iSCSI_TGT(1) transmits the direct server return DSR. Hence, in this embodiment, the network administrator of the storage system does not need to further install software in the targets iSCSI_TGT(0) and iSCSI_TGT(1).

Further, as shown in the lower half part of FIG. 7, the storage area network 100S(1) may include two switches SW(10) and SW(11) coupled between the broker module BPK and the targets iSCSI_TGT(0), iSCSI_TGT(1). Moreover, it should be noted that, in this embodiment, when the targets iSCSI_TGT(0) and iSCSI_TGT(1) directly respond to the initiator iSCSI_INT through transmitting the direct server return DSR, the direct server return DSR is transmitted to the switch SW(0) and then forwarded to the initiator iSCSI_INT through the switch SW(0). The response of the direct server return DSR does not need to be transmitted by the switches SW(10), SW(11) and the broker module BPK, thus reducing the time of responding the direct server return DSR to the initiator iSCSI_INT as well as preventing the broker module BRK from processing too much data. The illustrations similar to the aforementioned embodiments/modifications will be omitted in this embodiment for brevity.

As described above, the network administrator of the storage system may set the targets iSCSI_TGT(0) and iSCSI_TGT(1) in advance. However, this is merely for illustration, and is not meant to be a limitation of the present invention. According to a modification of this embodiment, in the beginning, when the broker module BPK publishes the command to the targets iSCSI_TGT(0) and iSCSI_TGT(1) to establish the aforementioned iSCSI session, the targets iSCSI_TGT(0) and iSCSI_TGT(1) may be informed of the IP address EXT_IP(0) of the broker module BPK, such that one of the targets iSCSI_TGT(0), iSCSI_TGT(1) may modify the external IP address in the packet of the direct server return DSR as the IP address EXT_IP(0) of the broker module MPK when utilizing the direct server return DSR.

Figure 8:
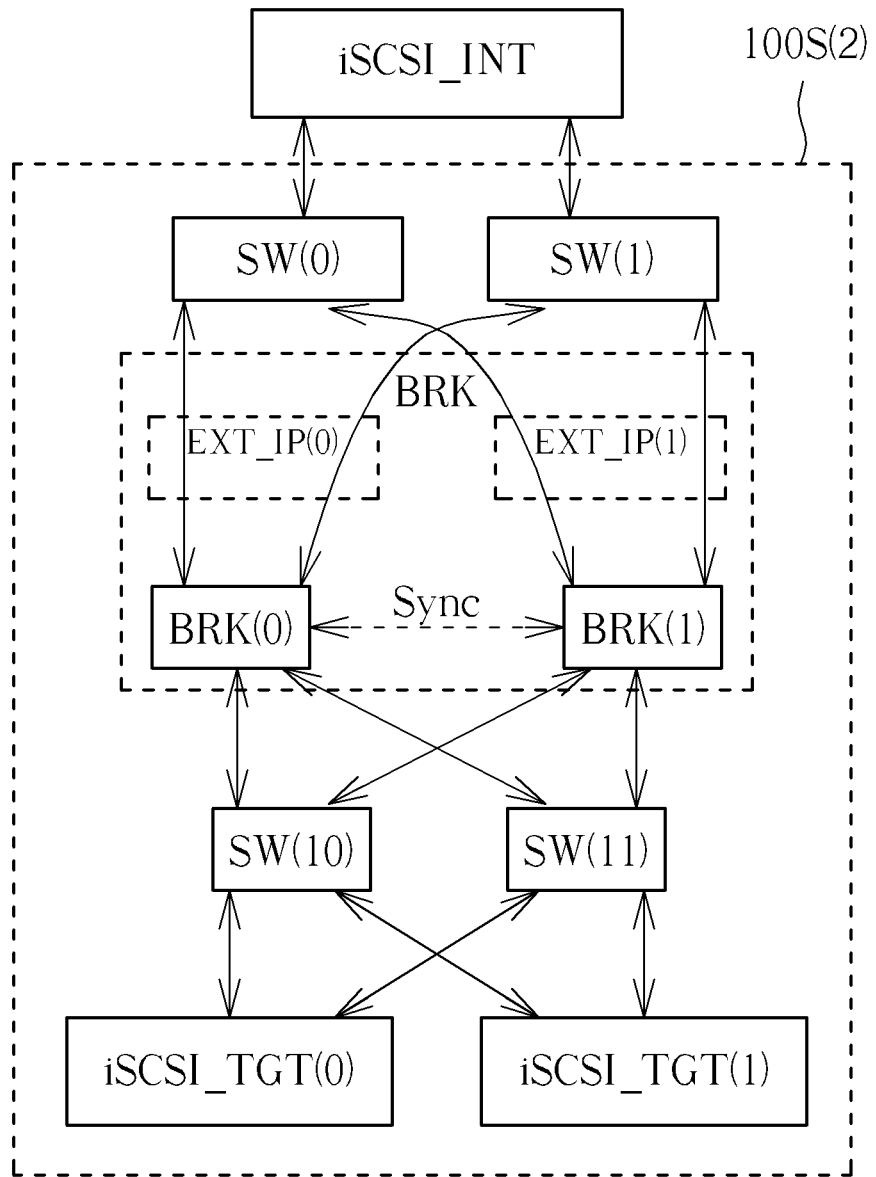
FIG. 8 depicts a control scheme involved by the method shown in FIG. 2 according to another embodiment.

Please refer to FIG. 8, which depicts a control scheme involved by the method 200 shown in FIG. 2 according to another embodiment, wherein the storage area network 100S(2) may be an example of the storage are network in the embodiment as shown in FIG. 1, and the broker module BPK in this embodiment may include the aforementioned two apparatuses. As shown in the upper half part of FIG. 8, the storage area network 100S(2) may include two switches SW(0) and SW(1) coupled between the initiator iSCSI_INT and the broker module BPK, and the broker sub-module BPK(0) and broker sub-module BPK(1) use the external IP addresses EXT_IP(0) and EXT_IP(1), respectively.

Please note that, when one of the target iSCSI_TGT(0) and the target iSCSI_TGT(1) utilizes the direct server return DSR to respond, the IP address in the packet of the direct server return DSR may be changed to the IP address of the broker module BPK(the aforementioned IP address EXT_IP (0), or the aforementioned IP address EXT_IP(1)) in advance, as if it were transmitted by the direct server return DSR from the broker module BPK. In practice, when the broker module BPK indicates one of the targets iSCSI_TGT (0) and iSCSI_TGT(1) as the primary node, the broker module will control this target to modify the IP address in the packet of the direct server return DSR before utilizing the direct server return DSR to respond. For example, when the broker sub-module BPK(0) obtains the main control, the IP address of the broker module BPK may be the IP address EXT_IP(0), and the IP address in the packer of the direct server return DSR may be changed to the IP address EXT_IP(0). For another example, when the broker sub-module BPK(1) obtains the main control, the IP address of the broker module BPK may be the IP address EXT_IP(1), and the IP address in the packer of the direct server return DSR may be changed to the IP address EXT_IP(1). In practice, since the aforementioned two broker sub-modules BPK(0) and BPK(1) use the external IP address EXT_IP(0) and EXT_IP(1), respectively, the broker sub-modules BPK (0) and BPK(1) may establish the iSCSI sessions for the initiator iSCSI_INT and the targets iSCSI_TGT(0), iSCSI_TGT(1), respectively. Hence, two iSCSI sessions have been established for each of the targets iSCSI_TGT(0), iSCSI_TGT(1). In this way, the aforementioned broker sub-modules BPK(0) and BPK(1) may be used together at the usual time to thereby enlarge the upper bound of the data flow, wherein when these two broker sub-modules BPK(0) and BPK(1) publish the respective received processing commands to their respective targets iSCSI_TGT(0), iSCSI_TGT(1), the broker sub-modules BPK(0) and BPK(1) may update the information of the unprocessed commands in their respective buffers from each other. Hence, when one of the targets iSCSI_TGT(0), iSCSI_TGT(1) utilizes the direct server return DSR to respond, this target may modify the IP address in the packet of the direct server return DSR thereof to be the IP address of the corresponding broker sub-module, especially the IP address of the broker sub-module in the broker sub-modules BPK(0) and BPK(1) that publishes corresponding commands (that is, the commands causing the direct server return DSR). For example, when the command causing the direct server return DSR is published by the broker sub-modules BPK(0), this target may modify the IP address in the packet of the direct server return DSR to be the IP address of the broker sub-module BPK(0) in advance. For another example, when the command causing the direct server return DSR is published by the broker sub-modules BPK(1), this target may modify the IP address in the packet of the direct server return DSR to be the IP address of the broker sub-module BPK(1) in advance. The illustrations similar to the aforementioned embodiments/modifications will be omitted in this embodiment for brevity.

Figure 9:
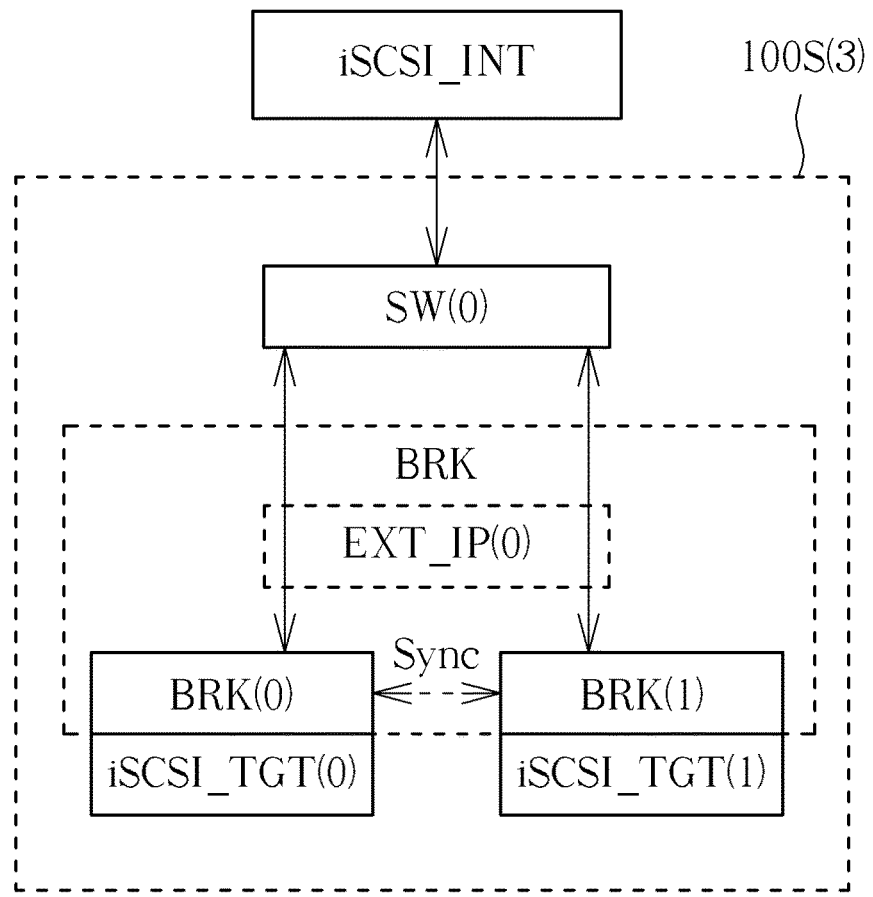
FIG. 9 depicts a control scheme involved by the method shown in FIG. 2 according to another embodiment.

Please refer to FIG. 9, which depicts a control scheme involved by the method 200 shown in FIG. 2 according to another embodiment, wherein the storage area network 100S(3) may be an example of the storage are network in the embodiment as shown in FIG. 1, and the broker module BPK in this embodiment may be the aforementioned at least one program module such as the programs executed at the targets iSCSI_TGT(0) and iSCSI_TGT(1), respectively. As shown in the upper half part of FIG. 9, the storage area network 100S(3) may include the aforementioned switch SW(0). Further, since the broker sub-module BPK(0) and broker sub-module BPK(1) are implemented as the programs executed at the targets iSCSI_TGT(0) and iSCSI_TGT(1), respectively, the aforementioned two switches SW(10) and SW(11) can be omitted. The illustrations similar to the aforementioned embodiments/modifications will be omitted in this embodiment for brevity.

Figure 10:
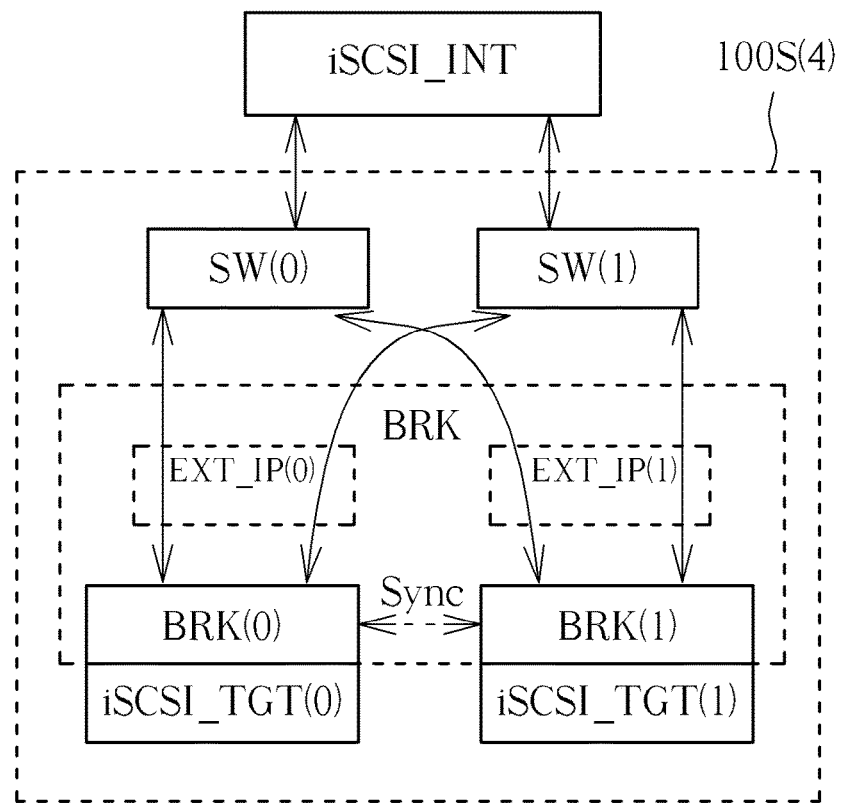
FIG. 10 depicts a control scheme involved by the method shown in FIG. 2 according to another embodiment.

Please refer to FIG. 10, which depicts a control scheme involved by the method 200 shown in FIG. 2 according to another embodiment, wherein the storage area network 100S(4) may be an example of the storage are network in the embodiment as shown in FIG. 1, and the broker module BPK in this embodiment may be the aforementioned at least one program module such as the programs executed at the targets iSCSI_TGT(0) and iSCSI_TGT(1), respectively. As shown in the upper FIG. 10, the storage area network 100S(4) may include the aforementioned switches SW(0) and SW(1). Further, since the brokers sub-module BPK(0) and broker sub-module BPK(1) are implemented as the programs executed at the targets iSCSI_TGT(0) and iSCSI_TGT(1), respectively, the aforementioned two switches SW(10) and SW(11) can be omitted. The illustrations similar to the aforementioned embodiments/modifications will be omitted in this embodiment for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for managing a storage system, wherein the storage system includes a plurality of network storage devices and comprises an internet small computer system interface (iSCSI) storage system; the method comprising:
   utilizing a broker module to receive a command from a client device; and
   utilizing the broker module to publish the command to a primary node and a secondary node in the storage system, to control the primary node and the secondary node to perform a same operation corresponding to the command, and utilizing the broker module to receive acknowledgement from the primary node and acknowledgement from the secondary node, wherein the primary node represents at least one network storage device utilized as a primary responder within the plurality of network storage devices, and the secondary node represents at least one network storage device utilized as a secondary responder within the plurality of network storage devices;
   utilizing the broker module to temporarily store information representing the command into a buffer, to indicate that an operation of a current session corresponding to the command is not completed;
   wherein the broker module performs both operations of receiving the command from the client device and publishing the command to physically existing devices including the primary node and the secondary node, rather than merely performing the operation of receiving the command from the client device; and
   when the primary node is in an abnormal state, utilizing the broker module to define the network storage devices represented by the secondary node and the primary node as a newest primary node and a newest secondary node, to utilize the newest primary node to directly respond to the client device via a direct server return.

2. The method of claim 1, wherein the command is an iSCSI command.

3. The method of claim 2, wherein the client device is an initiator of an iSCSI session, and the primary node and the secondary node are targets of the iSCI session.

4. The method of claim 1, further comprising:
   utilizing the broker module to control a specific node in the primary node and the secondary node to directly respond to the client device via a direct server return, wherein the specific node is selected according to states of the primary node and the secondary node, and another node in the primary node and the secondary node does not respond to the client device;
   utilizing the broker module to check whether the client device transmits an acknowledgement corresponding to the direct server return; and
   utilizing the broker module to erase the information representing the command in the buffer when the broker module receives the acknowledgement corresponding to the direct server return.

5. The method of claim 4, further comprising:
   utilizing the broker module to select the primary node as the specific node under a situation that the primary node is in an online state, to control the primary node to directly respond to the client device via the direct server return; and utilizing the broker module to select the secondary node as the specific node under a situation that the primary node is in an offline state, to control the secondary node to directly respond to the client device via the direct server return.

6. The method of claim 5, further comprising:
when the primary node is in the offline state, utilizing the broker module to control the secondary node to directly respond to the client device via the direct server return according to the information representing the command in the buffer.

7. A non-transitory computer program product, comprising a program code to instruct at least one processor to perform the method of claim 1.

8. An apparatus for managing a storage system, wherein the storage system includes a plurality of network storage devices and comprises an internet small computer system interface (iSCSI) storage system; the device comprising:
a network module, for providing a network service to the apparatus, to maintain an operation of the storage system; and
a processing circuit, coupled to the network module, the processing circuit arranged for controlling the operation of the storage system, wherein the processing circuit comprises:
a broker module, arranged to receive a command from a client device through the network module, wherein the broker module publishes the command to a primary node and a secondary node in the storage system, to control the primary node and the secondary node to perform a same operation corresponding to the command; and further arranged to receive acknowledgement from the primary node and acknowledgement from the secondary node, wherein the primary node represents at least one network storage device utilized as a primary responder within the plurality of network storage devices, and the secondary node represents at least one network storage device utilized as a secondary responder within the plurality of network storage devices;
wherein the broker module temporarily stores information representing the command into a buffer, to indicate that an operation of a current session corresponding to the command is not completed;
wherein the broker module performs both operations of receiving the command from the client device and publishing the command to physically existing devices including the primary node and the secondary node, rather than merely performing the operation of receiving the command from the client device; and
wherein when the primary node is in an abnormal state, the broker module defines the network storage devices represented by the secondary node and the primary node as a newest primary node and a newest secondary node, respectively, to utilize the newest primary node to directly respond to the client device via a direct server return.

9. The apparatus of claim 8, wherein the command is an iSCSI command.

10. The apparatus of claim 9, wherein the client device is an initiator of an iSCSI session, and the primary node and the secondary node are targets of the iSCSI session.

11. The apparatus of claim 8, wherein
the broker module controls a specific node in the primary node and the secondary node to directly respond to the client device via a direct server return, wherein the specific node is selected according to states of the primary node and the secondary node, and another node in the primary node and the secondary node does not respond to the client device;
the broker module checks whether the client device transmits an acknowledgement corresponding to the direct server return; and
the broker module erases the information representing the command in the buffer when the broker module receives the acknowledgement corresponding to the direct server return.

12. The apparatus of claim 11, wherein
the broker module selects the primary node as the specific node under a situation that the primary node is in an online state, to control the primary node to directly respond to the client device via the direct server return; and
the broker module selects the secondary node as the specific node under a situation that the primary node is in an offline state, to control the secondary node to directly respond to the client device via the direct server return.

13. The apparatus of claim 12, wherein when the primary node is in the offline state, the broker module controls the secondary node to directly respond to the client device via the direct server return according to the information representing the command in the buffer.

* * * * *